(12) United States Patent
Matsuoka (10) Patent No.: US 11,161,406 B2
(45) Date of Patent: Nov. 2, 2021

(54) POWER TRANSMISSION DEVICE FOR VEHICLE

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/445,901

(22) Filed: Jun. 19, 2019

(65) Prior Publication Data

US 2020/0047611 A1  Feb. 13, 2020

(30) Foreign Application Priority Data

Aug. 7, 2018 (JP) .............................. JP2018-148812
May 7, 2019 (JP) .............................. JP2019-087750

(51) Int. Cl.
*B60K 1/00* (2006.01)
*B60K 17/02* (2006.01)
*F16H 41/24* (2006.01)
*H02K 1/27* (2006.01)

(52) U.S. Cl.
CPC ............... *B60K 17/02* (2013.01); *B60K 1/00* (2013.01); *F16H 41/24* (2013.01); *H02K 1/27* (2013.01)

(58) Field of Classification Search
CPC .......... B60K 17/02; B60K 1/00; B60K 6/442; B60K 6/48; B60K 6/40
See application file for complete search history.

(56) References Cited

U.S. PATENT DOCUMENTS 5,045,035 A * 9/1991 Ganoung ................. F16H 47/06
188/DIG. 1
5,060,176 A * 10/1991 Nawa ..................... G01M 13/025
701/51

(Continued)

FOREIGN PATENT DOCUMENTS

| DE | 19504935 A1 | 8/1995 |
| JP | 2000-161483 A | 6/2000 |
| JP | 2011-231857 A | 11/2011 |

OTHER PUBLICATIONS

Extended European Search Report dated Dec. 4, 2019 for corresponding European Application No. 19185968.5, 11 pp.

*Primary Examiner* — Hau V Phan
(74) *Attorney, Agent, or Firm* — United IP Counselors, LLC (57) ABSTRACT

A power transmission device includes an electric motor, and a torque converter connected to the electric motor to transmit torque. A torque converter characteristic line is determined based on a capacity coefficient of the torque converter and indicates torque of the torque converter relative to each rotational speed of the torque converter. An electric motor characteristic line indicates a maximum output torque of the electric motor relative to each rotational speed of the electric motor. A first range corresponds to a range equal to and greater than a base rotational speed of the electric motor and equal to or less than a first average rotational speed, which is an average of the base rotational speed and a maximum rotational speed of the electric motor. The capacity coefficient is such that the characteristic line for the torque converter intersects the characteristic line for the electric motor in the first range.

7 Claims, 5 Drawing Sheets

(56) References Cited

U.S. PATENT DOCUMENTS

| | | | | |
|---|---|---|---|---|
| 6,012,899 A * | 1/2000 | Takada | .................... | F16H 41/26 |
| | | | | 415/191 |
| 6,183,389 B1 * | 2/2001 | Tabata | ................... | B60K 6/365 |
| | | | | 477/174 |
| 6,428,444 B1 * | 8/2002 | Tabata | ................... | B60W 30/19 |
| | | | | 477/3 |
| 7,096,099 B2 * | 8/2006 | Itoh | ......................... | B60K 6/48 |
| | | | | 180/65.25 |
| 8,010,264 B2 * | 8/2011 | Ogata | ..................... | B60K 6/48 |
| | | | | 701/55 |
| 8,135,522 B2 * | 3/2012 | Tabata | .................... | B60K 6/40 |
| | | | | 701/66 |
| 8,938,340 B2 * | 1/2015 | Teslak | .................... | F16H 61/04 |
| | | | | 477/111 |
| 9,132,829 B2 * | 9/2015 | Tabata | ................... | B60W 20/00 |
| 9,220,025 B2 * | 12/2015 | Poon | ................. | H04B 17/0082 |
| 9,476,369 B2 * | 10/2016 | Gregg | .................... | F02D 28/00 |
| 2008/0277223 A1 * | 11/2008 | Liang | .................... | F16H 45/02 |
| | | | | 192/3.21 |
| 2009/0014269 A1 * | 1/2009 | Ari | ......................... | F16H 45/02 |
| | | | | 192/3.33 |
| 2013/0109357 A1 * | 5/2013 | Ganatra | ................. | H04W 4/50 |
| | | | | 455/411 |
| 2014/0309079 A1 * | 10/2014 | Tabata | ................... | B60K 6/442 |
| | | | | 477/5 |
| 2017/0008510 A1 * | 1/2017 | Imamura | ............... | B60K 6/445 |

* cited by examiner

POWER TRANSMISSION DEVICE FOR VEHICLE

CROSS-REFERENCE TO RELATED APPLICATIONS

This application claims priority to Japanese Patent Application No. 2018-148812 filed Aug. 7, 2018 and Japanese Patent Application No. 2019-087750 filed May 7, 2019. The contents of those applications are incorporated by reference herein in their entirety.

TECHNICAL FIELD

The present disclosure relates to a power transmission device for a vehicle.

BACKGROUND ART

Conventional power transmission devices for vehicles are provided with a motor generator (electric motor) and a torque converter (see Japanese Laid-open Patent Application Publication No. 2011-231857). In this configuration, drive force of the motor generator is transmitted to an output shaft via the torque converter.

BRIEF SUMMARY

Figure 4:
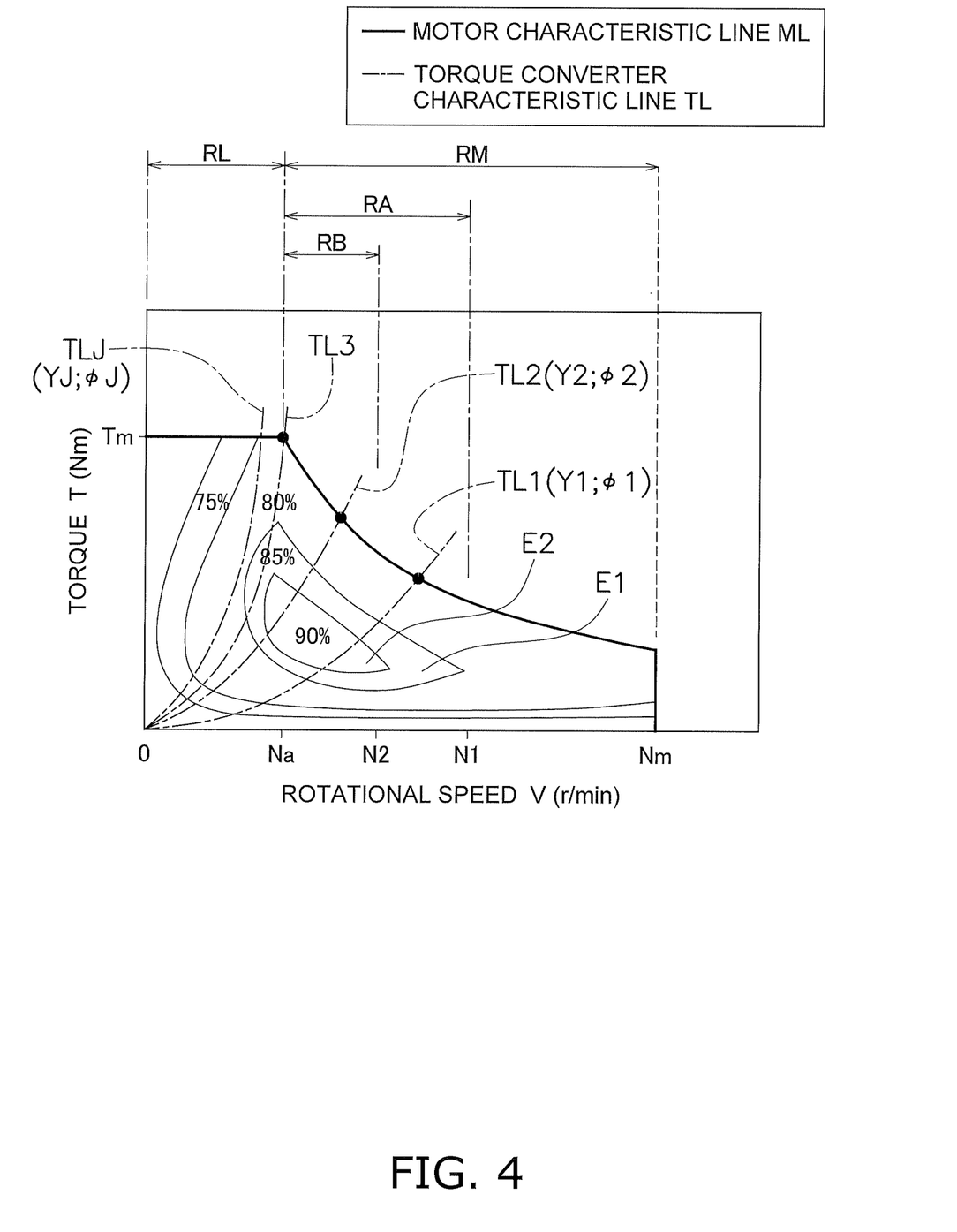
FIG. 4 is a graph showing characteristics of motors and characteristics of torque converters in power transmission devices of the present embodiment and of the prior art.

Generally, in a conventional power transmission device for a vehicle, a capacity coefficient YJ of a torque converter is set so that a characteristic line TLJ for the torque converter intersects a characteristic line ML for an electric motor in a range RL which is less than a base rotational speed, the characteristic line ML indicating a maximum output torque of a motor generator relative to each rotational speed of the motor generator, as shown in FIG. 4.

This is because a maximum output torque Tm of the motor generator in the range RL can be utilized by setting the capacity coefficient YJ of the torque converter so that the characteristic line TLJ for the torque converter intersects the characteristic line ML for the electric motor in the range RL.

However, there is a risk that the capacity coefficient YJ of the torque converter, e.g., the size (representative diameter φJ) of the torque converter, will increase in order to cause the characteristic line TLJ for the torque converter to intersect the characteristic line ML for the electric motor. In this case, the characteristic line TLJ for the torque converter passes through a low-efficiency region in an efficiency map of the motor generator as shown in FIG. 4, and a problem is therefore encountered in that the motor generator cannot be efficiently utilized.

The present disclosure was devised in view of the problem described above, and an object of the present disclosure is to provide a power transmission device for a vehicle in which the torque converter can be reduced in size. A further object of the present disclosure is to provide a power transmission device for a vehicle in which an electric motor can be efficiently utilized.

A power transmission device for a vehicle according to a first aspect of the present disclosure comprises an electric motor and a torque converter. The torque converter is connected to the electric motor and transmits torque of the electric motor to an output member.

In this aspect, a characteristic line for the torque converter is determined on the basis of a capacity coefficient of the torque converter. The characteristic line for the torque converter indicates torque of the torque converter relative to each rotational speed of the torque converter. A characteristic line for the electric motor indicates a maximum output torque of the electric motor relative to each rotational speed of the electric motor.

A first range corresponds to a range that is equal to and greater than a base rotational speed of the electric motor and is equal to or less than a first average rotational speed, which is an average of the base rotational speed of the electric motor and a maximum rotational speed of the electric motor. The torque converter includes a capacity coefficient such that the characteristic line for the torque converter intersects the characteristic line for the electric motor in the first range.

In the present power transmission device for a vehicle, the first range corresponds to a range that is equal to and greater than the base rotational speed of the electric motor and is equal to or less than the first average rotational speed. Specifically, the first range is greater than a range which is less than the base rotational speed and is equal to or less than the first average rotational speed. Additionally, the maximum output torque of the first range defined by the characteristic line for the electric motor is equal to and less than the maximum output torque in a low-rotational-speed range ($0 \leq$ rotational speed $\leq$ base rotational speed) defined by the characteristic line for the electric motor.

Comparing a first scenario in which the characteristic line for the torque converter intersects the characteristic line for the electric motor in the first range, and a second scenario (conventional scenario) in which the characteristic line for the torque converter intersects the characteristic line for the electric motor in the range which is less than the base rotational speed, the capacity coefficient of the first scenario is less than one of the second scenario.

By causing the characteristic line for the torque converter to intersect the characteristic line for the electric motor in the first range in this manner, the capacity coefficient of the torque converter can be made less than the capacity coefficient of a conventional torque converter. Specifically, the torque converter can be reduced in size. Additionally, by configuring the power transmission device as described above, the electric motor can be efficiently utilized because the characteristic line for the torque converter can pass through a high-efficiency region of the electric motor.

A power transmission device for a vehicle according to another aspect of the present disclosure is preferably configured in the following manner. A second range corresponds to a range that is equal to and greater than the base rotational speed of the electric motor and is equal to or less than a second average rotational speed, which is an average of the base rotational speed of the electric motor and the first average rotational speed of the electric motor. The torque converter includes a capacity coefficient such that the characteristic line for the torque converter intersects the characteristic line for the electric motor in the second range.

In this configuration, the second range corresponds to a range that is equal to and greater than the base rotational speed of the electric motor and is equal to or less than the second average rotational speed. Specifically, the second range is greater than the range which is less than the base rotational speed, and is equal to or less than the second average rotational speed.

By causing the characteristic line for the torque converter to intersect the characteristic line for the electric motor in the second range, the capacity coefficient of the torque converter can be made less than the capacity coefficient of a conventional torque converter. Specifically, the torque converter can be reduced in size. Additionally, by configuring the power transmission device as described above, the electric motor can be efficiently utilized because the characteristic line for the torque converter can pass through a high-efficiency region of the electric motor.

In a power transmission device for a vehicle according to another aspect of the present disclosure, the capacity coefficient is preferably a capacity coefficient in an instance where a speed ratio of the torque converter is zero. Even with this configuration, the electric motor can be efficiently utilized because the characteristic line for the torque converter can pass through the high-efficiency region of the electric motor.

In a power transmission device for a vehicle according to another aspect of the present disclosure, it is preferable that the electric motor has a stator, and a rotor that has a permanent magnet and is configured to be capable of rotating relative to the stator.

Due to this configuration, at least part of the high-efficiency region of the electric motor is formed in the above-described first region or the above-described second region, and the characteristic line for the torque converter can therefore reliably pass through the high-efficiency region of the electric motor. The electric motor can thereby be efficiently utilized.

In a power transmission device for a vehicle according to another aspect of the present disclosure, it is preferable that the base rotational speed is equal to and greater than 1500 (r/min) and is equal to and less than 3000 (r/min). Thereby, the torque converter can be suitably reduced in size.

In a power transmission device for a vehicle according to another aspect of the present disclosure, it is preferable that the base rotational speed is equal to and greater than 2000 (r/min) and is equal to and less than 2500 (r/min). Thereby, the torque converter can be suitably reduced in size.

In a power transmission device for a vehicle according to another aspect of the present disclosure, it is preferable that the characteristic line for the torque converter is set based on the base rotational speed. Thereby, the torque converter can be suitably matched to the electric motor. In other words, the torque converter can be reduced in size.

In the power transmission device for a vehicle of present disclosure, the torque converter can be reduced in size and the electric motor can be efficiently utilized.

DETAILED DESCRIPTION

<Overall Summary>

Figure 1:
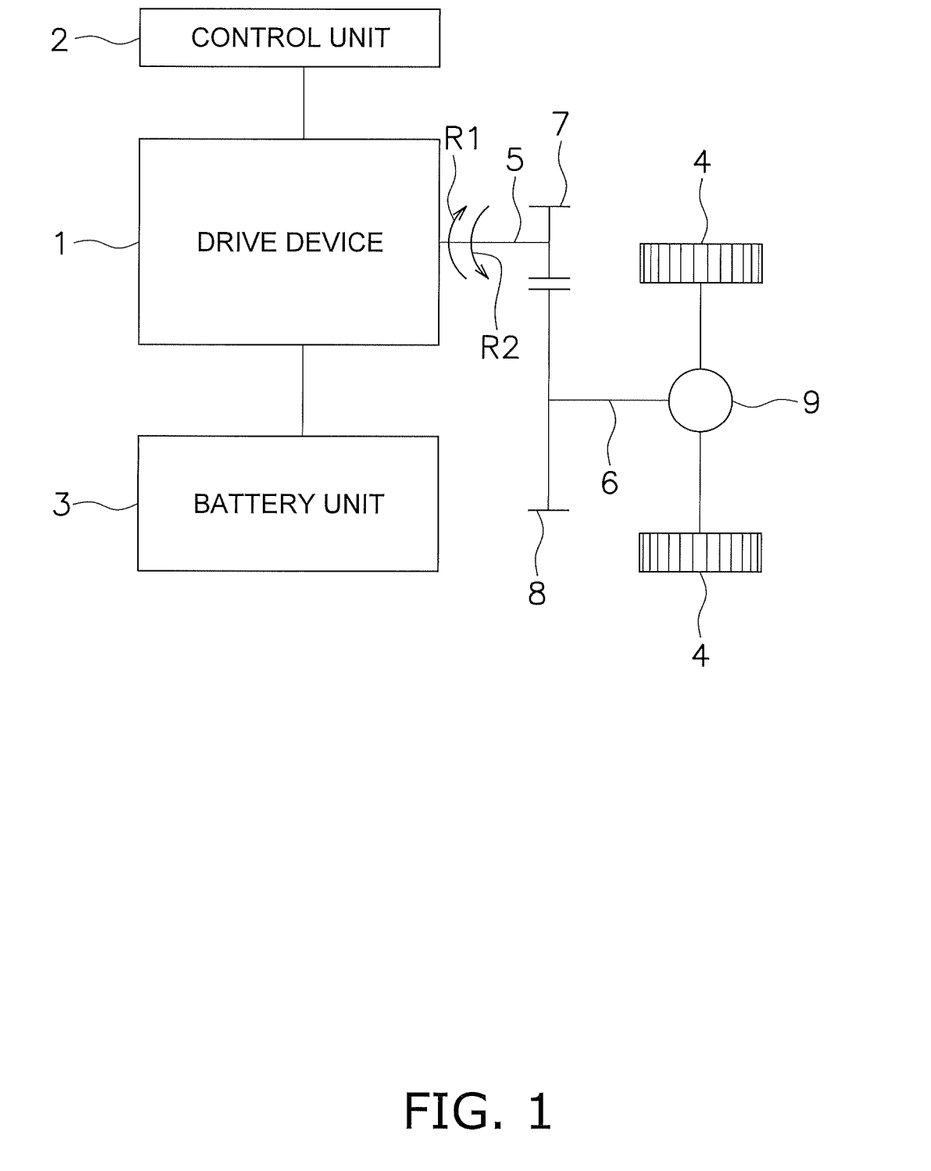
FIG. 1 is a schematic view showing an overall configuration of a vehicle according to the present embodiment.

FIG. 1 is a schematic view showing an overall configuration of a vehicle in which a power transmission device 1 of the present disclosure is disposed. A configuration relating to the power transmission device 1 is described in a simple manner using FIG. 1.

Disposed in the vehicle are, for example, the power transmission device 1, a control unit 2, and a battery unit 3, as shown in FIG. 1. In this embodiment, an example is shown of a case in which the control unit 2 and the battery unit 3 are not included in the power transmission device 1, but the control unit 2 and/or the battery unit 3 can be included in the power transmission device 1.

The power transmission device 1 is for driving drive wheels 4. The power transmission device 1 is installed in a vehicle body (not shown). The power transmission device 1 is actuated by electric power from the battery unit 3, and drives the drive wheels 4 via a first output shaft 5 (one example of an output member) and a second output shaft 6. A first gear part 7 is provided to the first output shaft 5. A second gear part 8 is provided to the second output shaft 6. The second gear part 8 meshes with the first gear part 7. A differential mechanism 9 is disposed between the second output shaft 6 and the drive wheels 4.

With this configuration, when drive force is transmitted from the power transmission device 1 to the first output shaft 5, the drive force is transmitted from the second output shaft 6 to the drive wheels 4 via the differential mechanism 9. Thus, the drive wheels 4 are driven by the power transmission device 1.

The term "drive force" includes torque. A power transmission path described above is one example, and the drive force of the power transmission device 1 can be transmitted to the drive wheels 4 using another output shaft and/or gear part as well. The details of the power transmission device 1 are described hereinafter.

The control unit 2 controls the power transmission device 1 and the battery unit 3. The control unit 2 is installed in the vehicle body. The control unit 2 is actuated by electric power from the battery unit 3.

The battery unit 3 supplies electric power to the power transmission device 1 and the control unit 2. The battery unit 3 is installed in the vehicle body. The battery unit 3 can be charged by an external power source. The battery unit 3 can also be charged using electric power generated in the power transmission device 1.

<Power Transmission Device>

Figure 2:
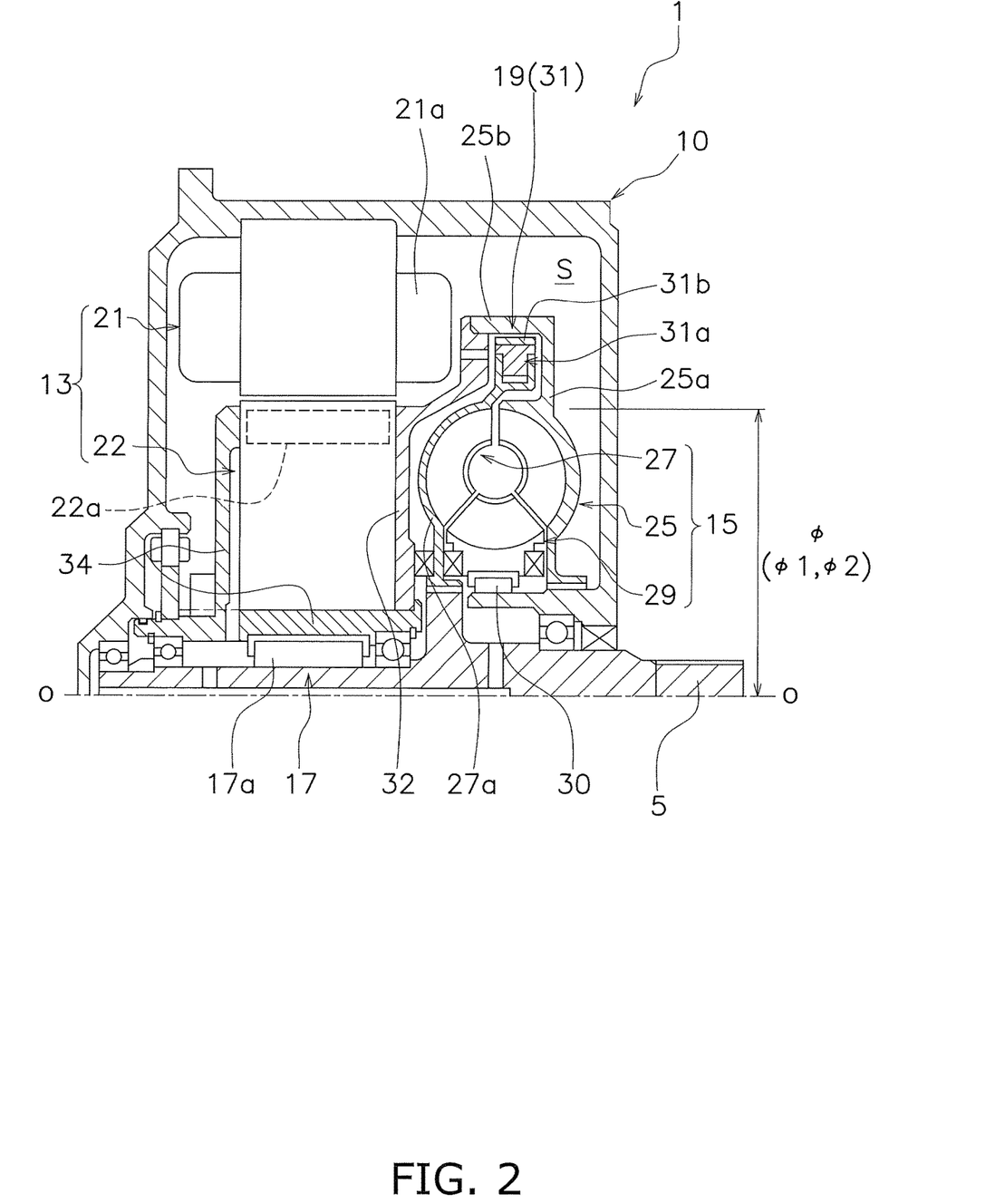
FIG. 2 is a cross-sectional view of a power transmission device of the present embodiment.

The power transmission device 1 is for transmitting drive force to the first output shaft 5. The power transmission device 1 is provided with a motor 13 (one example of an electric motor) and a torque converter 15, as shown in FIG. 2. Specifically, the power transmission device 1 is provided with a casing 10, the motor 13, and the torque converter 15. The power transmission device 1 is further provided with a rotation transmission structure 17. The power transmission device 1 is further provided with a lock-up structure 19. The casing 10 is attached to the vehicle body. The casing 10 has an internal space S.

(Motor)

The motor 13 is a drive part of the power transmission device 1. The motor 13 is disposed in the internal space S of the casing 10, as shown in FIG. 2. The motor 13 has a first stator 21 (one example of a stator) and a rotor 22. The first stator 21 is secured to the casing 10. A coil part 21a is provided to the first stator 21.

The rotor 22 is configured to be capable of rotating relative to the first stator 21. The rotor 22 is supported to be capable of rotating relative to the first output shaft 5. Specifically, the rotor 22 is supported through the rotation transmission structure 17 to be capable of rotating relative to the first output shaft 5.

The rotor 22 is positioned along an axial direction by a positioning member 34. The positioning member 34 is attached to the rotor 22 so as to be capable of rotating integrally with the rotor 22, and is supported on the first output shaft 5 so as to be capable of rotating relative to the first output shaft 5.

The rotor 22 has a permanent magnet. Specifically, the rotor 22 is provided with a magnet part 22a in which an N pole and an S pole are alternatingly disposed in a circumferential direction. The magnet part 22a is configured from a permanent magnet.

A current is supplied to the coil part 21a of the first stator 21 from the battery unit 3 (see FIG. 1), and when a magnetic field is generated between the coil part 21a and the magnet part 22a, the rotor 22 rotates relative to the first stator 21 about a rotational axis of the first output shaft 5. The current from the battery unit 3 is controlled by the control unit, whereby the rotation of the rotor 22 is controlled.

In the present embodiment, the motor 13 functions as a permanent magnet synchronous motor because the magnet part 22a having a permanent magnet is included in the rotor 22. Due to the motor 13 being configured in this manner, the motor 13 forms an efficiency map (see FIGS. 3A and 3B described hereinafter) having, for example, high-efficiency regions E1, E2 (see FIG. 4, described hereinafter) in the center.

(Torque Converter)

The torque converter 15 is connected to the motor 13. The torque converter 15 transmits drive force of the motor 13 to the first output shaft 5. Specifically, the torque converter 15 transmits the rotation of the rotor 22 to the first output shaft 5 when the rotor 22 rotates in a drive direction R1 (see FIG. 1). The drive direction R1 is a direction in which the rotor 22 is caused to rotate in order to move the vehicle forward.

The torque converter 15 is disposed inside the casing 10, i.e., in the internal space S of the casing 10, as shown in FIG. 2. The torque converter 15 has an impeller 25, a turbine 27, and a second stator 29. The torque converter 15 causes the impeller 25, the turbine 27, and the second stator 29 to rotate via hydraulic oil, whereby torque inputted to the impeller 25 is transmitted to the turbine 27.

The impeller 25 is configured to be capable of rotating integrally with the rotor 22. For example, the impeller 25, e.g., an impeller shell 25a, is secured to a cover part 32. A torque converter case is formed by the impeller shell 25a and the cover part 32 secured to the rotor 22. The torque converter case is a non-magnetic body.

The turbine 27 is linked to the first output shaft 5. The turbine 27 is linked to be capable of rotating integrally with the first output shaft 5. A turbine shell 27a of the turbine 27 is disposed between the impeller shell 25a and the cover part 32. The second stator 29 is configured to be capable of rotating relative to the casing 10. For example, the second stator 29 is disposed to be capable of rotating relative to the casing 10 by means of a one-way clutch 30.

(Rotation Transmission Structure)

The rotation transmission structure 17 selectively transmits the rotation of the rotor 22 to the first output shaft 5. The rotation transmission structure 17 is disposed in the internal space S of the casing 10, between the rotor 22 and the first output shaft 5, as shown in FIG. 2. For example, the rotation transmission structure 17 has a one-way clutch 17a.

For example, when the rotor 22 rotates in the drive direction R1, the one-way clutch 17a does not transmit the rotation of the rotor 22 to the first output shaft 5. Conversely, when the rotor 22 rotates in a counter-drive direction R2 (see FIG. 1), the one-way clutch 17a transmits the rotation of the rotor 22 to the first output shaft 5. The counter-drive direction R2 is a rotational direction opposite from the drive direction R1.

(Lock-Up Structure)

The lock-up structure 19 is disposed in the internal space S of the casing 10. The lock-up structure 19 links the impeller 25 and the turbine 27 so as to enable integrated rotation therebetween.

The lock-up structure 19 has a centrifugal clutch 31, as shown in FIG. 2. A centrifugal element 31a of the centrifugal clutch 31 is provided to the turbine 27, e.g., to the turbine shell 27a. Specifically, a plurality of centrifugal elements 31a configuring the centrifugal clutch 31 are disposed at intervals along the circumferential direction (rotational direction), and are held on the turbine shell 27a so as to be capable of moving radially relative to the turbine shell 27a and capable of rotating integrally with the turbine shell 27a.

The plurality of centrifugal elements 31a are disposed facing a radially outward side part 25b of the impeller shell 25a. A friction member 31b is provided to each of the plurality of centrifugal elements 31a. The friction members 31b of the centrifugal elements 31a are disposed at intervals away from the radially outward side part 25b of the impeller shell 25a.

Specifically, when centrifugal force is not acting on the plurality of centrifugal elements 31a, or when centrifugal force acting on the plurality of centrifugal elements 31a is less than a predetermined centrifugal force, the plurality of centrifugal elements 31a (the friction members 31b) are disposed at intervals away from the radially outward side part 25b of the impeller shell 25a. This state is a clutch OFF state.

Conversely, a state in which the friction members 31b of the centrifugal elements 31a are in contact with the radially outward side part 25b of the impeller shell 25a is a clutch ON state. Specifically, when the centrifugal force acting on the plurality of centrifugal elements 31a is equal to or greater than the predetermined centrifugal force, the plurality of centrifugal elements 31a (the friction members 31b) come into contact with the radially outward side part 25b of the impeller shell 25a. The impeller 25 and the turbine 27 are thereby linked so as to be capable of rotating integrally. This state is the clutch ON state.

<Characteristics of Motor and Torque Converter>

Figure 3A:
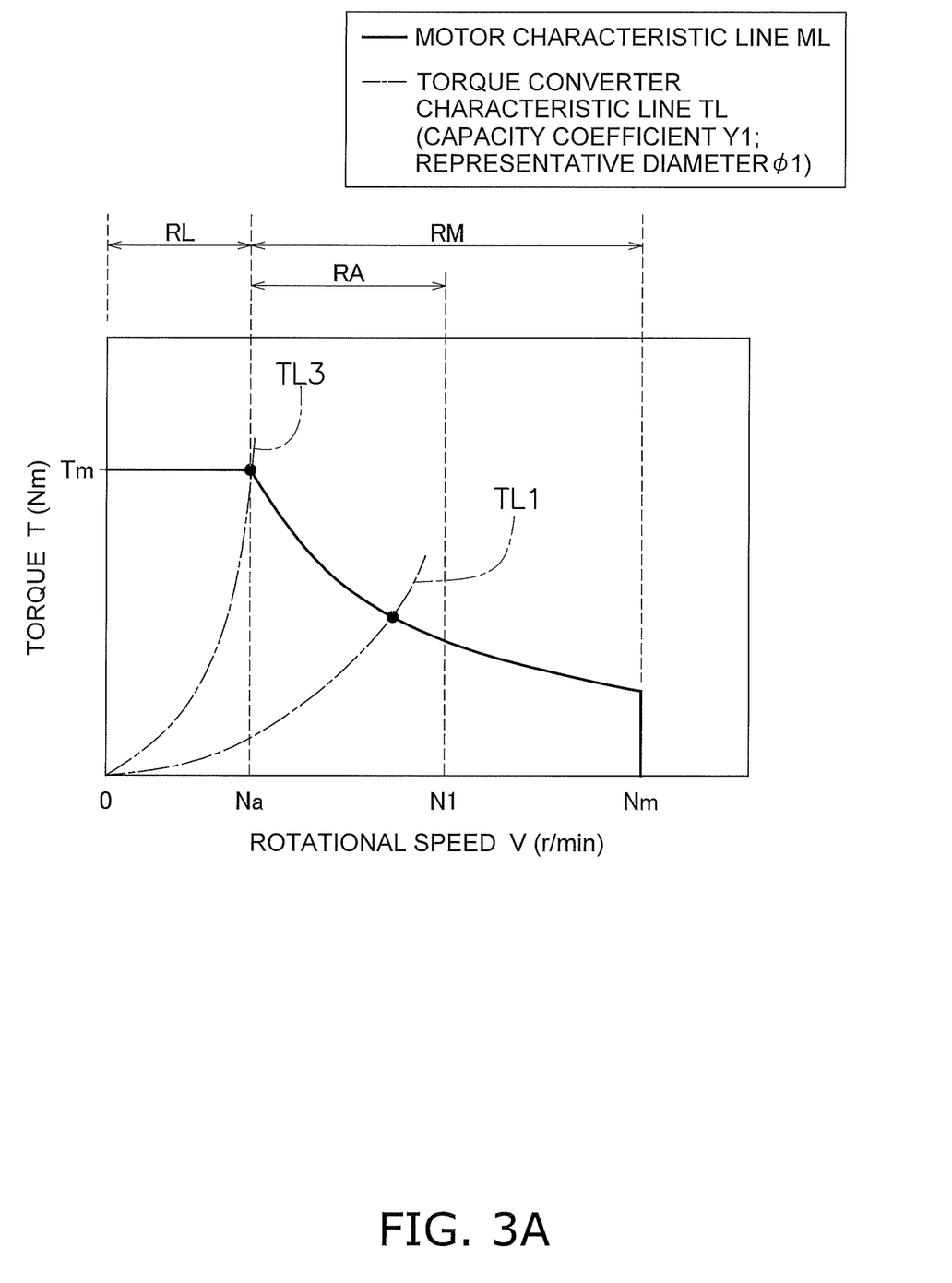
FIG. 3A is a graph showing a characteristic of a motor and a characteristic of a torque converter in the power transmission device of the present embodiment.
Figure 3B:
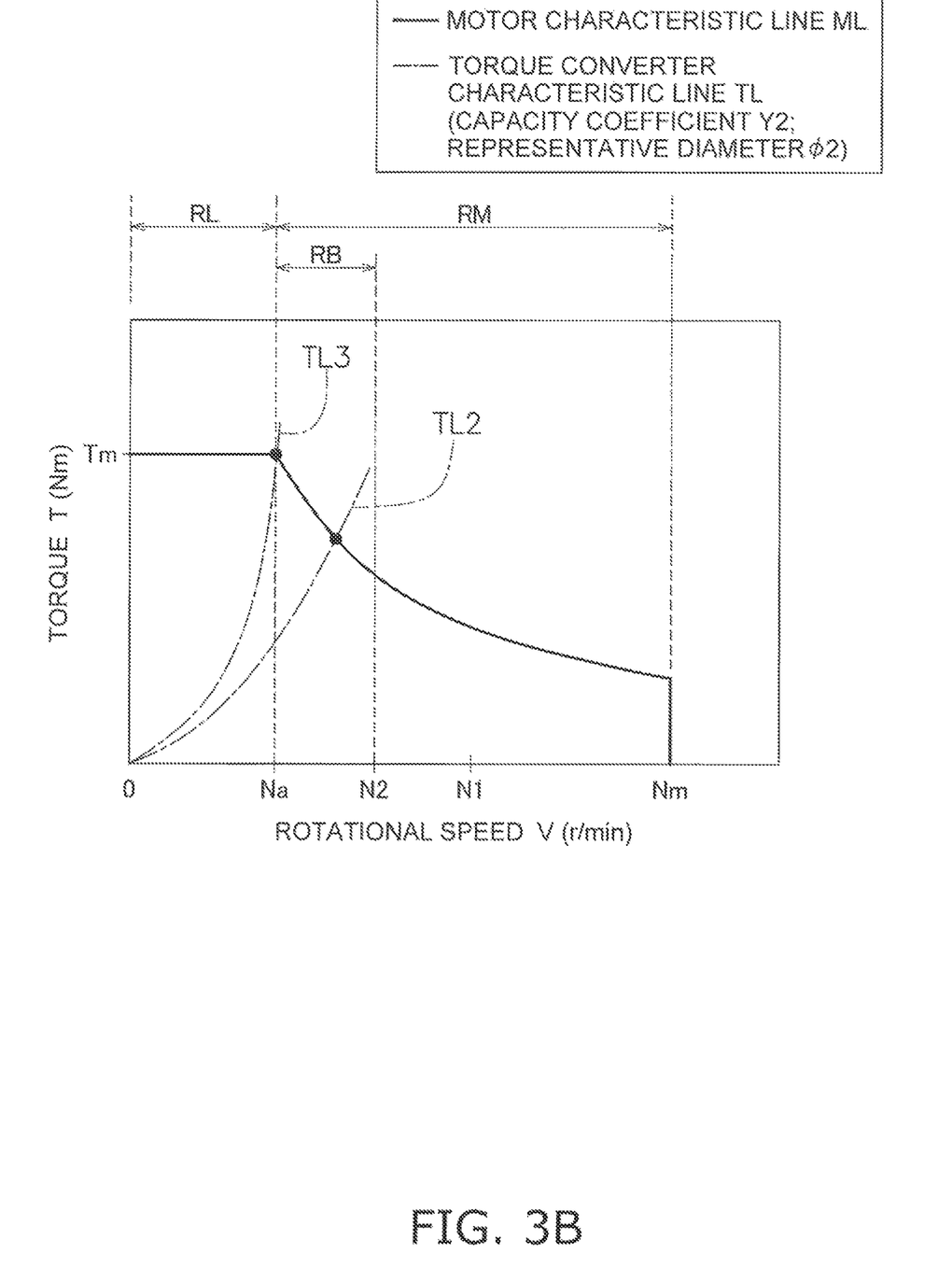
FIG. 3B is a graph showing a characteristic of the motor and a characteristic of the torque converter in the power transmission device of the present embodiment.

FIGS. 3A and 3B are graphs showing characteristics of the motor 13 and the torque converter 15, in which the horizontal axis represents rotational speed V (r/min) and the vertical axis represents torque T (Nm).

(Characteristic for Motor)

The solid lines in FIGS. 3A and 3B indicate a characteristic line ML for the motor when the motor 13 is actuated alone, as well as indicating a relationship between rotational speed V and output torque T in the motor 13. Specifically, the solid lines indicate a characteristic line ML for the motor when the motor 13 is actuated alone, as well as indicating the output torque T relative to each rotational speed V in the motor 13. The phrase "when the motor 13 is actuated alone" includes the meaning of "when the motor 13 is actuated alone without increasing or reducing speed."

In the characteristic line ML for the motor, a maximum output torque Tm of the motor 13 is kept substantially constant by limiting current in the low-rotational-speed range, e.g., a range in which the rotational speed V is equal to and greater than 0 and is equal to and less than a base rotational speed Na (0≤rotational speed≤base rotational speed Na).

On the other hand, in the characteristic line ML for the motor, at a rotational speed range RM having a rotational speed V greater than the base rotational speed Na of the low-rotational-speed range RL (base rotational speed Na<rotational speed V<maximum rotational speed Nm), the current flowing to the coil part 21a of the first stator 21 is reduced by a counter electromotive voltage as the rotational speed V of the motor 13 increases. Therefore, the maximum output torque T (T<Tm) of the motor 13 decreases.

The efficiency map of the motor 13 indicates a distribution of the efficiency of the motor 13, as shown in FIG. 4. The efficiency of the motor 13 is defined by a ratio of mechanical output (W) from the motor 13 to input electric power (W) inputted to the motor 13.

For example, the efficiency of the motor 13 is expressed as follows:

motor efficiency=[mechanical output ($W$)/input electric power ($W$)]×100(%)

The input electric power is expressed as follows:

input electric power ($W$)=voltage ($V$)×current ($A$)

The mechanical output is expressed as follows:

mechanical output ($W$)=rotational speed (r/min)× torque ($Nm$)

(Characteristic for Torque Converter)

The single-dash lines in FIGS. 3A and 3B indicate a characteristic line TL for the torque converter 15, as well as indicating a relationship between rotational speed V and torque T in the torque converter 15. Specifically, the single-dash lines correspond to a capacity coefficient Y (Y1 and Y2, described hereinafter) in the torque converter 15.

The input rotational speed V of the torque converter 15 is a rotational speed inputted from the motor 13 to the torque converter 15. The input torque T of the torque converter 15 is the torque inputted from the motor 13 to the torque converter 15.

The characteristic line TL (TL1 and TL2, described hereinafter) for the torque converter 15 is determined on the basis of the capacity coefficient Y. For example, in the characteristic line TL for the torque converter 15, the torque T is proportional to the square of the rotational speed V. The capacity coefficient Y is a proportionality coefficient. Specifically, the characteristic line TL for the torque converter 15 is expressed by "$T=Y\times(V^2)$." The characteristic line TL for the torque converter 15 thereby draws nearer to the vertical axis as the capacity coefficient Y increases, and draws away from the vertical axis as the capacity coefficient Y decreases.

The size, e.g., the representative diameter φ of the torque converter 15 is defined on the basis of the capacity coefficient Y. The representative diameter φ is an outside diameter of a torus (a fluid operation chamber). For example, the capacity coefficient Y is proportional to the fifth power of the size, e.g., the representative diameter φ of the torque converter 15. Specifically, the capacity coefficient Y is expressed as $Y=A\times(\varphi^5)$. In this equation, A is a proportionality coefficient and is set to a predetermined value. The capacity coefficient Y thereby decreases when the representative diameter φ of the torque converter 15 decreases. In other words, when the capacity coefficient Y decreases, the representative diameter φ of the torque converter 15 decreases.

To summarize what is described above, the representative diameter φ of the torque converter 15 decreases as the capacity coefficient Y decreases. Additionally, when the capacity coefficient Y, e.g., the representative diameter φ of the torque converter 15, decreases, the characteristic line TL for the torque converter 15 draws away from the vertical axis.

(Relationship of Motor and Torque Converter)

In the characteristic graph shown in FIG. 3A, the capacity coefficient Y1 of the torque converter 15 is such that the characteristic line TL1 for the torque converter 15 intersects the characteristic line ML for the motor in a first range RA. The capacity coefficient Y1 is preferably a capacity coefficient in where a speed ratio of the torque converter 15 is zero. The speed ratio is defined by, for example, a ratio of a rotational speed of the turbine 27 to a rotational speed of the impeller 25. Hereinafter, the intersection point of the characteristic line TL1 for the torque converter 15 and the characteristic line ML for the motor is indicated by a black circle.

The first range RA corresponds to a range equal to and greater than the base rotational speed Na of the motor 13, and equal to or less than a first average rotational speed N1. The first average rotational speed N1 is determined by an average of the base rotational speed Na of the motor 13 and the maximum rotational speed Nm of the motor 13. The base rotational speed Na of the motor 13 is a speed at which a switch is made from a state in which torque is constant to a state in which the mechanical output described above is constant.

The characteristic line TL1 for the torque converter 15 is determined on the basis of the capacity coefficient Y1. Specifically, the capacity coefficient Y1, e.g., a representative diameter φ1 of the torque converter 15, is established such that the characteristic line TL1 for the torque converter 15 intersects the characteristic line ML for the motor in the first range RA.

Due to this configuration, in a case in which the characteristic line TL1 for the torque converter 15 intersects the characteristic line ML for the motor in the first range RA (see FIG. 3A), the characteristic line TL1 for the torque converter 15 draws farther away from the vertical axis than in a case in which the characteristic line TLJ for the torque converter 15 intersects the characteristic line ML for the motor in the range RL which is less than the base rotational speed Na (see FIG. 4) as in the prior art.

Specifically, in a case in which the characteristic line TL1 for the torque converter 15 intersects the characteristic line ML for the motor in the first range RA (see FIG. 3A), the characteristic line TL2 for the torque converter 15 draws farther away from the vertical axis than in a case in which the characteristic line TLJ for the torque converter 15 intersects the characteristic line ML for the motor in the range RL which is less than the base rotational speed (see FIG. 4) as in the prior art.

In this case, the capacity coefficient Y1 is less than the capacity coefficient YJ of the prior art. Specifically, the representative diameter φ1 is less than a representative diameter φJ of the prior art. Thus, in the present power transmission device 1, the torque converter 15 can be reduced in size.

The torque converter 15 can have a capacity coefficient Y2 such that the characteristic line TL2 for the torque converter 15 intersects the characteristic line ML for the motor in a second range RB, as shown in FIG. 3B. The capacity coefficient Y2 is preferably a capacity coefficient in a case in which the speed ratio of the torque converter 15 is zero.

The second range RB corresponds to a range equal to and greater than the base rotational speed Na of the motor 13, and equal to or less than a second average rotational speed N2. The second average rotational speed N2 is determined by an average of the base rotational speed Na of the motor 13 and the first average rotational speed N1 of the motor 13.

The characteristic line TL2 for the torque converter 15 is determined on the basis of the capacity coefficient Y2. Specifically, the capacity coefficient Y2, e.g., a representative diameter φ2 of the torque converter 15, is established so that the characteristic line TL2 for the torque converter 15 intersects the characteristic line ML for the motor in the second range RB.

Due to this configuration, in a case in which the characteristic line TL2 for the torque converter 15 intersects the characteristic line ML for the motor in the second range RB (see FIG. 3B), the characteristic line TL2 for the torque converter 15 draws farther away from the vertical axis than in a case in which the characteristic line TLJ for the torque converter 15 intersects the characteristic line ML for the motor in the range RL which is less than the base rotational speed (see FIG. 4), as in the prior art.

In this case, the capacity coefficient Y2 is less than the capacity coefficient YJ of the prior art. Specifically, the representative diameter φ2 is less than the representative diameter φJ of the prior art. Even with this configuration, in the present power transmission device 1, the torque converter 15 can be reduced in size.

Whether to use the torque converter 15 having the characteristic line TL1 (capacity coefficient Y1 and representative diameter φ1) shown in FIG. 3A or the torque converter 15 having the characteristic line TL2 (capacity coefficient Y2 and representative diameter φ2) shown in FIG. 3B as the torque converter 15 is preferably selected in accordance with the efficiency map of the motor 13.

When the characteristic lines TL1, TL2 for the torque converter 15 are caused to intersect the characteristic line ML for the motor as in FIGS. 3A and 3B, the characteristic lines TL1, TL2 for the torque converter 15 pass through a first region E1 in the efficiency map of the motor 13.

Specifically, in a state in which the characteristic lines TL1, TL2 for the torque converter 15 respectively intersect the characteristic line ML for the motor in the first range RA or the second range RB, the characteristic lines pass through the first region E1 and a second region E2 in the efficiency map of the motor 13.

In this embodiment, the first region E1 indicates a region in which, for example, the efficiency of the motor 13 is 85% or greater in the efficiency map of the motor 13. The second region E2 indicates a region in which the efficiency of the motor 13 is 90% or greater in the efficiency map of the motor 13.

Specifically, the torque converter 15 has the capacity coefficients Y1, Y2 such that the characteristic lines TL1, TL2 for the torque converter 15 respectively pass through the first region E1 (a region of 85%) of the efficiency map of the motor 13, or the first region E1 (a region of 85%) and the second region E2 (a region of 90%) of the efficiency map.

Thus, the motor 13 can be efficiently utilized by causing the characteristic line TL for the torque converter 15 to pass through high-efficiency regions E1, E2 (the first region E1 and/or the second region E2) in the efficiency map of the motor 13. Specifically, torque can be efficiently outputted from the power transmission device 1 to the first output shaft 5.

In this embodiment, the capacity coefficient of the torque converter 15 is preferably 5 to 30×10$^{-6}$ (Nm/(r/min)$^2$). It is possible to efficiently utilize the motor 13 while reducing the torque converter 15 in size by configuring the motor 13 and the torque converter 15 using the torque converter 15 having such characteristics. Specifically, torque can be efficiently outputted from the power transmission device 1 to the first output shaft 5 while reducing the torque converter 15 in size.

Other Embodiments

The previous embodiment is not provided by way of limitation to the present disclosure; various modifications or revisions can be made without deviating from the scope of the present disclosure.

(A) The configuration of the previous embodiment is not provided by way of limitation to the configuration of the power transmission device 1, which can be configured in any manner as long as the torque and rotation of the motor 13 can be transmitted to the torque converter 15.

(B) In the previous embodiment, an example was presented of a case in which the rotation transmission structure 17 selectively transmits the rotation of the rotor 22 to the first output shaft 5. In a case in which this rotation transmission structure 17 is replaced by a rotation support structure and the rotor 22 rotates in the drive direction R1 or the counter-drive direction R2, the rotation of the rotor 22 can be transmitted to the first output shaft 5 via the torque converter 15.

(C) In the previous embodiment, an example was presented of a case in which the lock-up structure 19 has the centrifugal clutch 31, but the lock-up structure 19 can be configured in any manner as long as the impeller 25 and the turbine 27 can be linked to be capable of rotating integrally.

(D) In the previous embodiment, an example was presented of a case in which the characteristic lines TL1, TL2 for the torque converter 15 pass through both the first region E1 and the second region E2 in the efficiency map of the motor 13, but the capacity coefficients Y1, Y2 are preferably established so that the characteristic lines TL1, TL2 for the torque converter 15 pass through at least the first region E1 (a region of 85%).

(E) In the previous embodiment, as shown in FIG. 3A, FIG. 3B, and FIG. 4, the characteristic line TL3 of the torque converter 15 is set based on the base rotational speed Na of the motor 13. For example, the characteristic line TL3 of the torque converter 15 intersects the characteristic line ML of the motor 13 on the base rotational speed Na of the motor 13 (or near the base rotational speed Na of the motor 13).

In this case, the base rotational speed Na is set in a predetermined range DNa. For example, it is preferable that the predetermined range DNa is equal to and greater than 1500 (r/min) and is equal to and less than 3000 (r/min). Specifically, it is preferable that the predetermined range DNa is equal to and greater than 2000 (r/min) and is equal to and less than 2500 (r/min).

The motor 13 is selected such that the base rotational speed Na is included in the predetermined range DNa. In case that the motor 13 is selected such that the base rotational speed Na is not included in the predetermined range DNa, the motor 13 is adjusted such that the base rotational speed Na is included in the predetermined range DNa.

The characteristic line TL3 of the torque converter 15 is set based on the base rotational speed Na of this motor 13 (or a value near the base rotational speed Na of this motor 13). In other words, the torque converter 15 can be suitably matched to the motor 13 by providing the torque converter 15 including the characteristic line TL3 respect to the motor 13 including the above base rotational speed Na. In other words, the torque converter 15 can be reduced in size.

REFERENCE SIGNS LIST

1 Power transmission device
13 Motor
15 Torque converter
21 First stator
22 Rotor
TL1, TL2 Characteristic lines for torque converter
TLJ Characteristic line for conventional torque converter
ML Characteristic line ML for electric motor
RA First range
RB Second range
E1 First region
E2 Second region
Y1, Y2 Capacity coefficients
YJ Conventional capacity coefficient
φ1, φ2 Representative diameter
φJ Conventional representative diameter

The invention claimed is:

1. A power transmission device for a vehicle, comprising:
an electric motor; and
a torque converter connected to the electric motor and configured to transmit torque of the electric motor to an output member, the torque converter including a fluid operation chamber, wherein
a characteristic line for the torque converter is determined based on a fluid performance of the fluid operation chamber defined by an outer diameter of the fluid operation chamber in a radial direction, and indicates a transmitting torque of the torque converter relative to an input rotational speed of the torque converter at a predetermined rotational speed ratio of the input rotational speed and an output rotational speed of the torque converter,
a characteristic line for the electric motor indicates a maximum output torque of the electric motor relative to an output rotational speed of the electric motor,
a first range corresponds to a range that is equal to and greater than a base rotational speed of the electric motor and is equal to or less than a first average rotational speed which is an average of the base rotational speed of the electric motor and a maximum rotational speed of the electric motor, and
the outer diameter of the fluid operation chamber is adjusted in the radial direction such that the characteristic line for the torque converter intersects the characteristic line for the electric motor in the first range.

2. The power transmission device for a vehicle according to claim 1, wherein
a second range corresponds to a range that is equal to and greater than the base rotational speed of the electric motor and is equal to or less than a second average rotational speed, which is an average of the base rotational speed of the electric motor and the first average rotational speed of the electric motor, and
the outer diameter of the fluid operation chamber is adjusted in the radial direction such that the characteristic line for the torque converter intersects the characteristic line for the electric motor in the second range.

3. The power transmission device for a vehicle according to claim 1, wherein
the fluid performance is a capacity coefficient in a case where the predetermined rotational speed ratio of the torque converter is zero.

4. The power transmission device for a vehicle according to claim 1, wherein
the electric motor includes a stator, and a rotor that has a permanent magnet and that is configured to rotate relative to the stator.

5. The power transmission device for a vehicle according to claim 1, wherein
the base rotational speed is equal to and greater than 1500 (r/min) and is equal to and less than 3000 (r/min).

6. The power transmission device for a vehicle according to claim 5, wherein
the base rotational speed is equal to and greater than 2000 (r/min) and is equal to and less than 2500 (r/min).

7. The power transmission device for a vehicle according to claim 5, wherein
the characteristic line for the torque converter is set based on the base rotational speed.

* * * * *